United States Patent
Adler et al.

[15] 3,707,710
[45] Dec. 26, 1972

[54] DEVICE FOR TESTING THE VIGILANCE OF A PERSON

[72] Inventors: Karl Adler, Grenchen; Wolfgang Karger, Bochum, both of Germany

[73] Assignee: Bivator S.A., Geneva, Switzerland

[22] Filed: Dec. 15, 1970

[21] Appl. No.: 98,330

Related U.S. Application Data

[63] Continuation-in-part of Ser. No. 776,702, Nov. 18, 1968, abandoned.

[52] U.S. Cl. .....................340/279, 128/2 T, 180/99, 340/53
[51] Int. Cl. .............................................B60k 27/08
[58] Field of Search..........128/2 T, 2 N, 2 R; 351/17, 351/36; 340/53, 52 R, 279; 180/99; 123/198 D

[56] References Cited

UNITED STATES PATENTS

| | | | |
|---|---|---|---|
| 3,312,508 | 4/1967 | Keller et al. | 340/279 |
| 2,495,708 | 1/1950 | Draeger et al. | 128/2 T |
| 3,665,447 | 5/1972 | Bidwell et al. | 340/279 |

*Primary Examiner*—John W. Caldwell
*Assistant Examiner*—Glen R. Swann, III
*Attorney*—Imirie and Smiley

[57] ABSTRACT

A device for testing the vigilance of a person based on his flicker fusion threshold, having at least two luminous indicators of which at least one is flickering, whereby selection of the flickering indicator or comparison of flickering frequencies is possible.

28 Claims, 6 Drawing Figures

INVENTORS
KARL ADLER & WOLFGANG KARGER
BY
[signature]

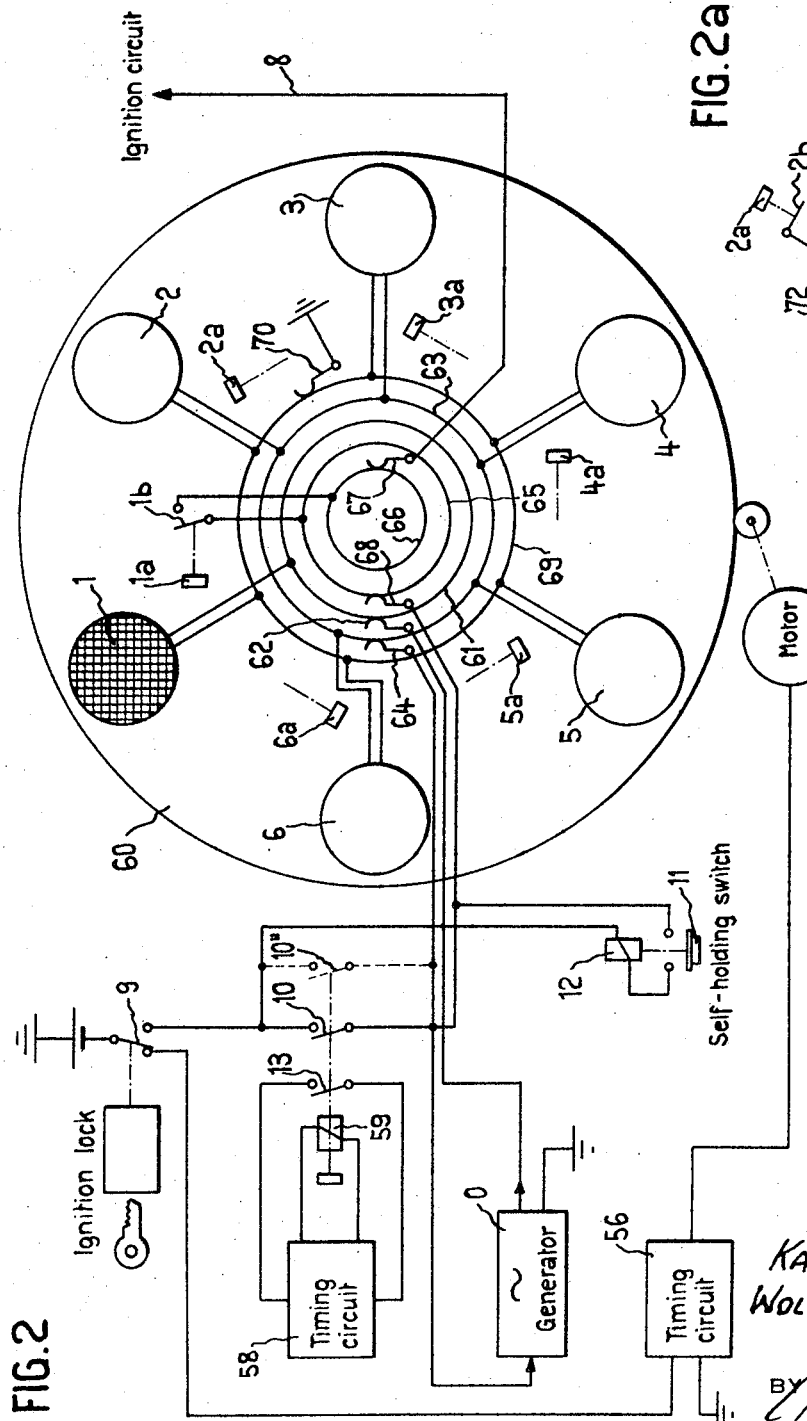

KARL ADLER &
WOLFGANG KARGER,
INVENTORS

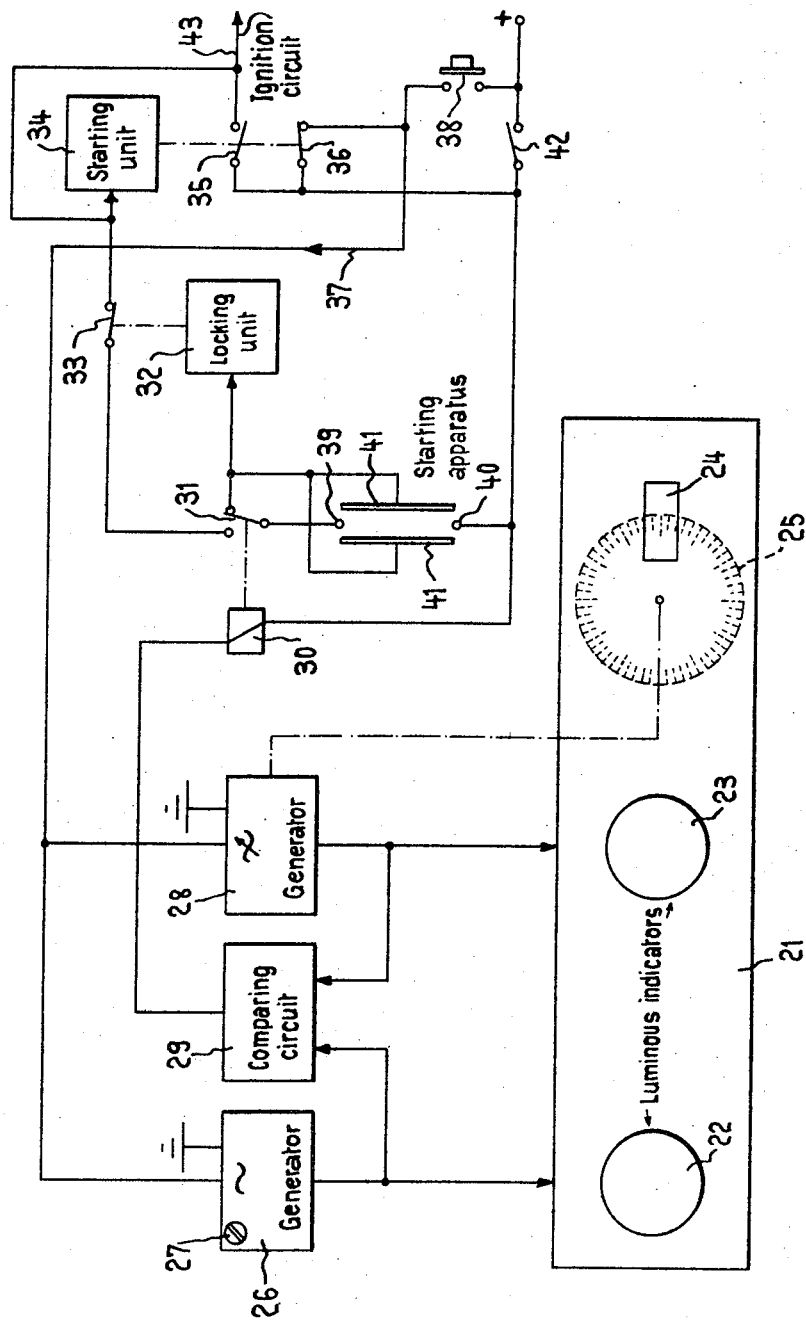

DEVICE FOR TESTING THE VIGILANCE OF A PERSON

CROSS REFERENCE TO RELATED APPLICATION

This application is a continuation-in-part of application, Ser. No. 776,702, filed Nov. 18, 1968, and now abandoned.

BACKGROUND OF THE INVENTION

This invention relates to devices for testing the vigilance of a person based on his individual flicker fusion threshold. It is well known that the lowest frequency of a succession of light pulses producing the impression of a continuous light, is a measure of the general condition of a person, particularly his reaction speed or generally speaking his vigilance. Hitherto this knowledge remained of substantially academic importance, that is, devices based on this knowledge and serving for testing the vigilance have only been used for scientific investigations. Particularly, prior devices have been designed in view of such use. They generally have an alternating voltage generator of adjustable frequency and a luminous indicator connected thereto and flickering at the generator frequency. By adjustment of the generator frequency it is ascertained at which frequency the fusion threshold occurs for the tested person and this frequency allows conclusions on the vigilance of the person. The test is carried out with constant brightness of the luminous indicator. However, means may also be provided for adjustment of the brightness for investigation of the dependance of the fusion threshold from the light intensity.

SUMMARY OF THE INVENTION

Apparatus of the above type designed for scientific purposes are not suitable for general practical use. Even the simplest test, for instance determination of the flicker fusion threshold with a predetermined brightness of the luminous indicator requires much time in order of minutes. However, it would appear desirable to have a test device based on the above scientific principles for simply and rapidly testing the vigilance of car drivers, pilots or generally of persons about to take high risks or high responsibility. It is an object of this invention to provide devices of this type which are simple in their operation and allow rapid testing of the actual condition of persons. It is another object of this invention to simplify scientific tests and researches in the field of the flicker fusion effect. The device according to this invention is broadly characterized by at least two simultaneously and independently operable luminous indicators and, at least two energy sources adapted to individually operate seperate luminous indicators under various conditions, thereby allowing comparison of at least two indications by said person. In a simple test device, for instance for car drivers, a single flickering indicator may be provided together with a number of continuously illuminated indicators fed with direct current, said single flickering indicator being adjusted to a lower limit frequency individually selected for the person to be tested, whereby the person is fit for driving a car or taking over any other task when he is able to immediately distinguish the flickering indicator from the others. Another simple test is possible with a device allowing comparision of a standardized reference frequency with an adjustable frequency. In this way it is very simple to combine quick checking of the personal vigilance with an automatic supervision of a start circuit, thereby allowing supervision of the ability to drive a vehicle on a broad basis.

BRIEF DESCRIPTION OF THE DRAWING

FIGS. 2 and 2a are circuit diagrams of a modification of the first embodiment, FIG. 4 illustrates a third embodiment and FIG. 5 is a circuit diagram of the test dircuit of another embodiment of the invention.

DESCRIPTION OF THE PREFERRED EMBODIMENTS

Figure 1:
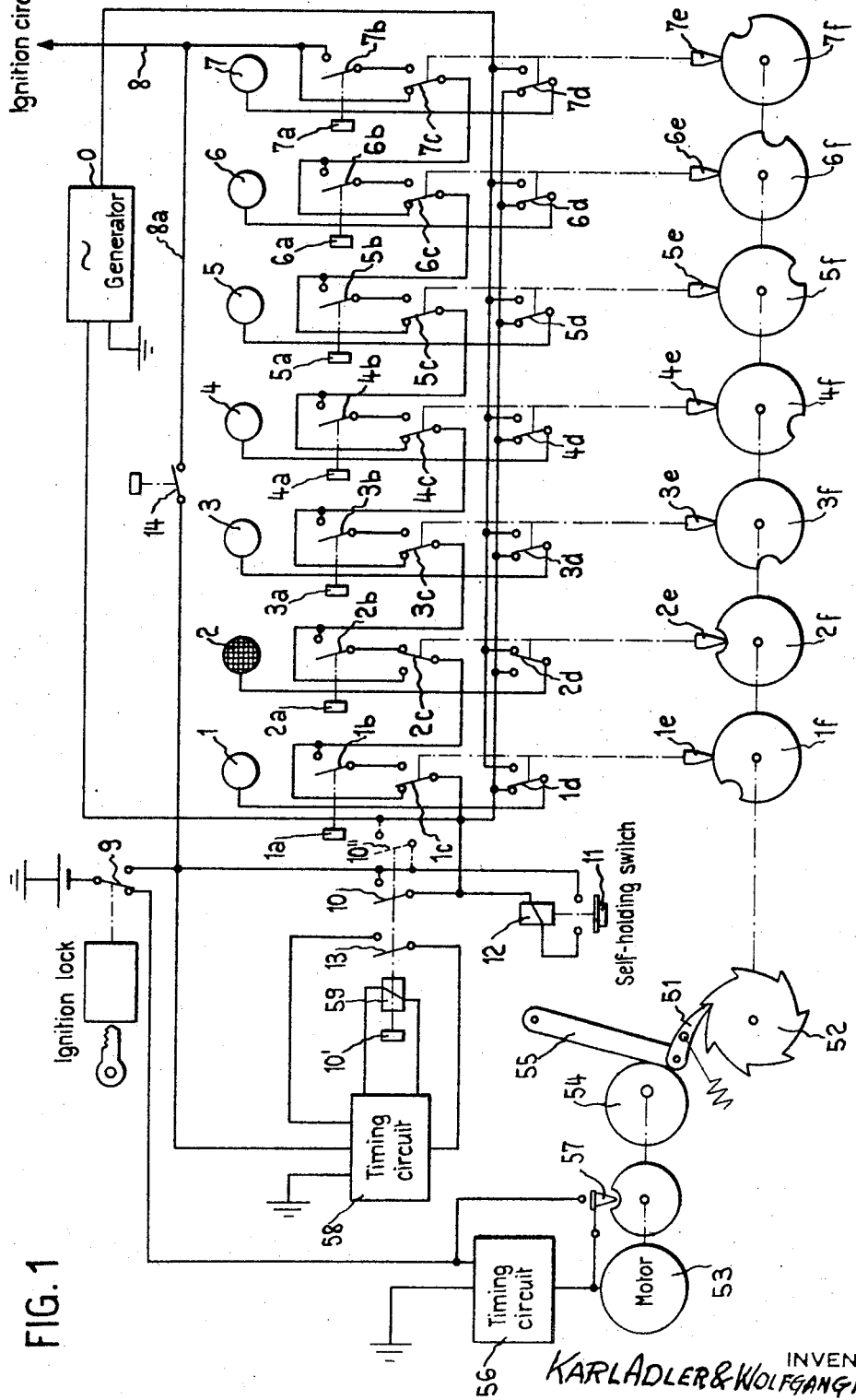
FIG. 1 is a circuit diagram of the test circuit of a first embodiment of the invention.

Referring to FIG. 1, the device schematically illustrated therein has a row of luminous indicators 1 to 7. This number is arbitrary and may be higher or lower. One of the hand-operable keys 1a to 7a is associated with each indicator for operating making switches 1b to 7b. Switches 1b to 7b are mutually interlocked in a manner well known in the art such that only one switch may be actuated and closed at a time and that any switch previously closed is opened upon closure of another switch. One of seven change-over switches 1c to 7c is further associated with each of the luminous indicators 1 to 7. In their rest position as shown for switches 1c and 3c to 7c these switches are series connected in an ignition circuit 8 of a motor car. Energization of this circuit occurs in the usual manner by means of a schematically indicated ignition lock and ignition switch 9.

Each of the luminous indicators 1 to 7 is connected to one of the change-over switches 1d to 7d. The fixed contacts of switches 1d to 7d are connected to the input side of the ignition circuit 8 at switch 1c and to the output of a generator 0 respectively. This generator is energized from the input terminal of the ignition circuit at switch 1c and is adapted for oscillation within a suitable range, for instance from 20 to 80 cycles/s.

Pairs of switches 1c to 7c and switches 1d to 7d are controlled by one of seven feelers 1e to 7e actuated each by one of seven cam discs 1f to 7f. Cam discs 1f to 7f are fixed on a common cam shaft. Each of the cam discs 1f to 7f has a notch into which the feeler 1e to 7e may fall. The notches of succeeding cam discs are circumferentially staggered by one-seventh of a revolution. The cam shaft may be advanced by steps one-seventh revolution by means of a stepping pawl 51 acting onto a ratchet wheel 52 having seven teeth, such that for any possible angular position to which the cam shaft may be brought, one of the feelers 1e to 7e engages a notch of the associated cam disc 1f to 7f so that the associated switches c and d are thrown from their usual rest position at the left to an operating position at the right as shown for switches 2c and 2d in FIG. 1. Pawl 51 may be actuated by means of a motor 53 driving an eccentric 54 acting on pawl lever 55. The motor is controlled by a timing circuit 56 and a self-breaking cam-controlled switch 57.

One of the luminous indicators 1 to 7, in the example indicator 2, may be energized from generator 0 through switch 2d. Therefore, the luminous indicator 2 flickers, this being indicated in the drawing by cross-hatching of the indicator. All other indicators may be energized by direct current through switches 1d and 3d to 7d and will not flicker. The flicker frequency of oscillator 0 and of the luminous indicator 2 respectively is adjusted to a lower frequency limit individually associated to the person to be tested, the frequency being so adjusted that the person will immediately see the flickering indicator if the person's vigilance is sufficient for a predetermined activity, in the present example for driving a motor car. The change-over switch 2c associated with indicator 2 is not in its rest position, but in the operative position as illustrated, in which it breaks the ignition circuit 8. In this test position it is connected to the switch 2b of unit 2 and thus prepares a circuit which may be closed by operation of switch 2b.

The start or ignition circuit 8 comprises a switch 10 operable by means of a pushbutton 10'. A switch 11 having a self-holding winding 12 is connected in parallel to switch 10. A switch 13 is operable together with switch 10, switch 13 being connected into the energizing circuit of an electronic timing circuit 58 acting onto a self-holding relay 59 of switches 10 and 13 and adapted to automatically release and open switches 10 and 13 after a relatively short time interval of 2 or 3 seconds whenever the switches have been closed manually. Of course any available switch with mechanically delayed breaking action may be used instead of an electronic time relay.

The starting or ignition circuit 8 passing through units 1 to 7 may be bridged by an emergency circuit 8a by closure of a switch 14. The conditions under which the emergency switch 14 may be operated need no particular explanation.

FIG. 1 illustrates the circuit in a rest condition with the ingnition switch 9 open. When this switch is closed by means of the ignition key, the ignition is not yet energized because the ignition circuit 8 is broken at both parallel switches 10 and 11. By closing switches 10 and 13 all luminous indicators 1 to 7 are energized either by direct current or by generator 0 which is now switched on, through switches 1d to 7d. When the operator has the required vigilance he will immediately see that indicator 2 flickers and he will press key 2a and thus close the switch 2b. In this way the ignition circuit 8 is completed through ignition switch 9, switch 10 and switches 1c, 2c, 2b and 3c to 7c and the vehicle may be started. At the end of a relatively short time interval the switch 10 is automatically opened as explained above whereby the ignition circuit would be broken. However, for continuous closure of the ignition circuit switch 11 may now be closed and remains closed by the ignition current flowing through the coil 12 of this switch. The vehicle may now be started definitely and the ignition circuit remains closed until it is opened by the ignition switch 9 whereby winding 12 is deenergized and switch 11 opens.

When the ignition switch 9 is opened, the self-holding switch or relay 11, 12 is deenergized. Whenever the ignition switch 9 returns into its rest position illustrated in FIG. 9, a d.c. pulse is transmitted to the input of timing circuit 56, this circuit being triggered for energizing motor 53 for a limited time of a few seconds. Upon rotation of motor 53 the cam shaft carrying discs 1f to 7f is advanced by any indefinite number or steps of one-seventh revolution each. When the timing circuit 56 triggers back into its initial condition, motor 53 is still energized through its self-breaking switch 57 until cam 54 has returned into the definite illustrated rest position, in which stepping pawl 51 has completed a full stepping movement. Therefore, the cam shaft will always stop in one of seven definite positions for which one of feelers 1e to 7e engages the notch of the associated cam disc 1f to 7f and reverses the associated switches c and d into the operating position illustrated in FIG. 1 for switches 2c and 2d. In this way the device is prepared for another test, it being impossible to have knowledge of the new position of the flickering indicator because the circuit has been changed arbitrarily. It is always necessary to properly actuate the switch associated with the flickering indicator. If the flickering indicator is not seen, this being a sign for insufficient vigilance, the correct switch may only be actuated fortuitously. Therefore, it is highly improbable that the vehicle supervised by the device illustrated in FIG. 1 may be started and used in spite of insufficient vigilance.

As explained above, the device always returns into an inoperable condition within 2 to 3 seconds when the operator is unable to make out the flickering indicator and to actuate the associated hand switch within this time interval. Therefore, it is possible to repeat the test successively within short intervals of a few seconds with a chance to fall on the correct key within reasonable time and to start the vehicle without having the required vigilance. In order to exclude this possibility a suitable locking circuit may be added for completely shutting down the device for a suitable time interval of 15 minutes as an example, whenever a wrong hand switch is operated during the test. Starting of the vehicle by chance would thus take so much time that illicit starting would not be tried.

The stationary arrangement of a row of luminous indicators and of associated switches 1b to 7b, 1c to 7c and 1d to 7d as shown in FIG. 1 requires a relatively complicated commutating unit as shown in FIG. 1 for arbitrarily connecting one of the indicators to the generator and for throwing the associated switch c into its test position. The circuitry of such a device may substantially be simplidied if the luminous indicators 1 to 7 and the associated switches are fixed on a rotatable carrier in central-symmetrical, circular arrangement, and when means are provided for rotating the carrier by an accidental angle after each test in order to bring one indicator which is always connected to the generator into various positions.

FIG. 2 illustrates a circuit of this kind, whereby corresponding circuit elements are designated with the same reference numerals as in FIG. 1. In this embodiment six luminous indicators 1 to 6 are fixed on a rotatable disc 60. Indicator 1 is connected to the output of oscillator 0 through a slip ring 61 mounted on disc 60 and a brush 62. The remaining indicators 2 to 6 are connected to the connection between switches 10 and 11 through a slip ring 63 and a brush 64. Keys 1a to 6a are mounted on the disc 60. Key 1a associated with the indicator 1 connected to the oscillator acts on a switch 1b, this switch being connected directly into the ignition circuit 8 through slip rings 65 and 66 and brushes 67 and 68 respectively. The other keys 2a to 6a are blind keys mechanically similar to key 1a but operating no switches. The return conductors from all indicators 1 to 6 are connected to a common slip ring 69 connected to earth through a brush 70. Motor 53 directly drives disc 60 for changing its angular position.

Operation of the device shown in FIG. 2 is similar to the operation explained above in connection with FIG. 1. After closure of the ignition switch 9 and switch 10 the oscillator 0 and indicators 2 to 6 are energized with direct current while indicator 1 is energized with alternating current at the frequency of oscillator 0. If the operator now sees that indicator 1 flickers and presses the associated key 1a, the ignition circuit is closed through switch 10, brush 68, slip ring 65, switch 1b, slip ring 66 and brush 67. the ignition circuit may the finally be closed by means of switch 11, by which switch 10 is continuously bridged when the latter returns into its open rest position. When the ignition switch 9 is reversed the timing circuit 56 is triggered for energizing the motor 53 for a limited time of a few seconds during which disc 60 with all indicator is rotated into a arbitrary new position. Thereby the flickering indicator 1 is displaced to any arbitrary new position so that the associated switch key 1a may only be properly operated during the next test if the operator is able to locate the flickering indicator.

As shown in FIG. 2a in order not to overload FIG. 2, switches 2b to 6b operable by means of keys 2a to 6a may be provided, such switches being connected in parallel to slip rings 71 and 72 fixed on disc 60 (FIG. 2). By means of brushes these slip rings 71 and 72 are connected to a timing circuit 73 the output of which is connected to a relay winding 75 having a breaking switch 74 in the ignition circuit 8. Whenever one of keys 2a to 6a is pressed instead of the correct key 1a associated with the flickering indicator 1, the input circuit of timing circuit 73 is closed and this circuit is triggered to energize relay winding 75 during a suitable time of 15 minutes as an example. Therefore, once the device has been operated in a faulty manner because flickering of indicator 1 is not seen by a person having insufficient vigilance, it will be impossible to start the vehicle for 15 minutes.

Figure 3:
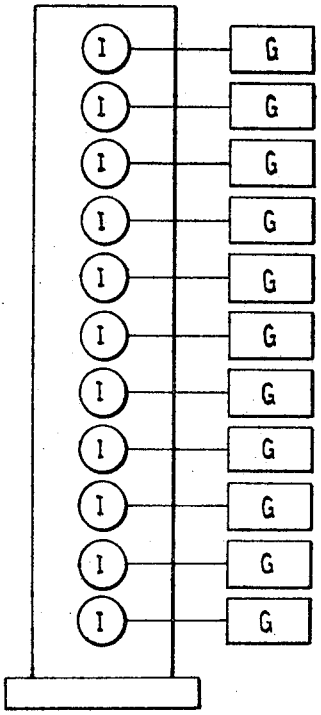
FIG. 3 illustrates a second embodiment.

The device illustratet in FIG. 1 allows testing of the personal vigilance by relatively simple means, that is with a single generator adjusted to a fixed frequency, one flickering indicator, and within short time. However, the device does not allow measurement of the real fusion threshold and consequently of the actual degree of vigilance, but it only allows to determine whether the vigilance is above or below a predetermined minimum. In many cases it is desirable to determine the real fusion threshold and vigilance of a person by means of a simple device and in short time. To this end a device as shown in FIG. 3 may be used having a number of luminous indicators I arranged in a vertical row and flickering at graduated frequencies produced by generators G, for instance at frequencies increasing from the bottom to the top of the row. The graduation may also be made in such a way that the highest or lowest frequency or intensity is located in the middle of the row. With this device it is possible to determine immediately to which height, that is up to what frequency the flickering of the indicators may be seen, whereby the observer is informed on his personal vigilance. The device may be used without any attendance, this being an advantage in that any active physical effort of a person slightly increases the vigilance.

Figure 4:
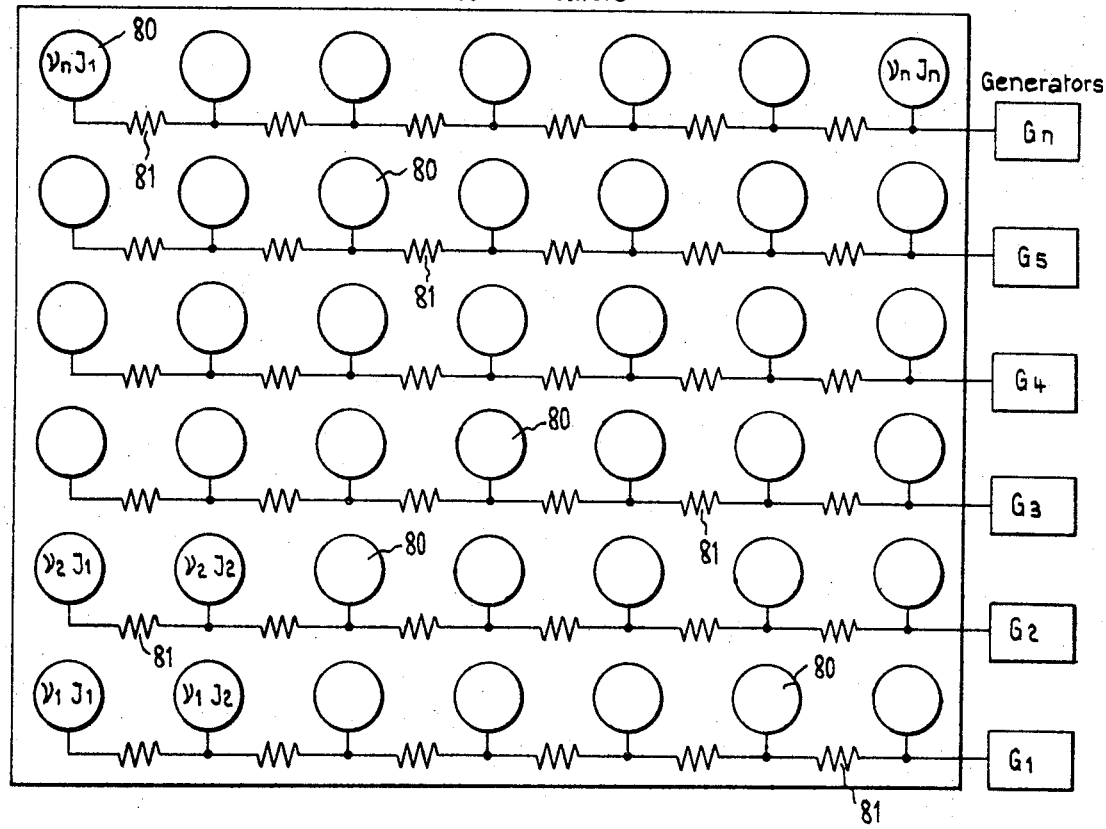

In another embodiment of the invention shown in FIG. 4, the idea of simplifying and shortening testing of the vigilance by simultaneous display of a number of luminous indicators is used for measurement and registration respectively of diagrams. This embodiment comprises a complete two-dimensional field or grid of luminous indicators flickering at frequencies increasing in one coordinate direction, for instance in vertical direction and with intensities increasing in the other coordinate direction, for instance in horizontal direction. In other words all indicators of a horizontal row flicker at the same frequency whereby the frequency gradually increases in the upper rows, and all indicators of a vertical row flicker with the same intensity, whereby the intensity of the rows gradually increases or decreases.

All frequencies $\nu_1 \ldots \nu_n$ and all intensities $J_1 \ldots J_n$ are thus simultaneously displayed by means of a two-dimensional field or grid of lamps as shown in FIG. 4. Each frequency is produced by one of the generators $G_1$ to $G_n$ and the intensity of the indicators 80 is graduated by resistors 81. Other circuit means may be used. As an example, potentiometers may be used instead of resistors 81, and such potentiometers may be connected to a common bus bar for each frequency in order that the intensity of each indicator may individually be adjusted independently of the others.

The observer sees a personal flicker boundary between a part of the lamp field appearing flickering and a part appearing not flickering. Usually this flicker boundary will not be a straight line but will be curved so that a correction of distortion or standardization on a base line may be advisable. When the flicker boundary should appear to the observer as a horizontal line (under standardized conditions) substantially in the middle of the lamp field, he may straighten this line for instance by increasing or decreasing the frequencies $\nu_1 \ldots \nu_n$ by an amount of $\Delta\nu$, with a predetermined intensity J. If twin potentiometers are used having two units on a common shaft, the adjusted values of the second potentiometers may be used for electronic evaluation and registration of the subjective impression.

The observer may also directly draw the observed boundary on a glass pane or on a transparent paper mounted in front of the lamp field.

After taking any drugs influencing the condition of the central nervous system or after execution of an activity resulting in physical fatigue the shape of the flicker boundary will gradually change in the manner of a spectrum. The transients may be drawn repeatedly within suitable time intervals.

If a second similar lamp field or grid is provided the flicker boundary may be reproduced in a relatively simple manner on the second lamp field. As an example, when the observer glides with his finger along the flicker boundary appearing to him on the first lamp field, circuits may be energized and electronically maintained energized due to actuation of switches or touching of conducting areas on lamp field 1 whereby the lamps along a line corresponding to the line of field 1 are illuminated on lamp field 2 thus reproducing the boundary line.

The importance of such a device for testing the effects of psycho-pharmacas and for quantitative evaluation of physical fatigue caused by efforts and activities is obvious.

Another embodiment of the invention, particularly suitable for use in vehicles for supervision of a starting circuit is illustrated in FIG. 5. It comprises two luminous indicators 22 and 23 and a scale 25 behind a window 24 on a front plate 21. The window 24 is usually closed by a cover which may be removed when reading of the scale 25 is desired. Indicator 22 is connected to a low-frequency generator 26 of which the frequency may be adjusted by means of a schematically illustrated screw 27 and usually remains unchanged subsequently. The indicator 23 is connected to a low-frequency generator 28 of which the frequency may be adjusted by means of a potentiometer. The scale 25 is mounted on the shaft of this potentiometer and indicates the frequency of generator 28. The indicators 22 and 23 flicker at the frequency of generators 26 and 28 respectively. The generator outputs are connected to a comparing circuit 29, for instance an interference meter measuring the frequency difference between generators 26 and 28. The output voltages of generators 26 and 28 are of the same character, that is, both generators produce sinusoidal voltages or rectangular voltages of the same shape, and indicators 22 and 23 have the same intensity.

The output of the comparing circuit 29 is connected to a starting relay 30 having a change-over switch 31. When the relay 30 is deenergized switch 31 closes a locking circuit connected to a locking unit 32. This locking unit is a monostable delay circuit, for instance an electromechanical time switch or a monostable multivibrator and actuates a rest contact 33. This rest contact 33 is series connected into a starting circuit with the making contact of the change-over switch 31. The starting circuit is connected to a starting unit 34, in the present case to a relay having a self-holding contact 35 and a rest contact 36. The rest contact 36 is connected into the feed circuit 37 of generators 26 and 28 and comparing circuit 29. The circuit 37 may also be closed by means of a manually operable bridging switch 38.

Change-over switch 31 of relay 30 is connected to a stationary contact 39 of a starting apparatus having a manually displaceable contact 40. For closing contacts 39 and 40 the displaceable contact 40 has to be carried between two contact bars 41 connected to the locking circuit. The system consisting of elements 30 to 41 may be energized by means of a main switch 42. The self-holding switch 35 of relay 34 closes a starting circuit 43, for instance the ignition circuit of a motor car, together with the self-holding contact 35.

The device illustrated in FIG. 5 is adjusted and operated as follows:

The frequency of generator 26 is adjusted to a predetermined reference frequency which has been ascertained as being the lowest fusion frequency at which a particular person is still able to drive a car. For starting a motor car the main start switch 42 is now closed as usual. However, closure of this switch does not change the condition of the locking circuitry in any way since all circuits are broken either by switches 39 and 40, by the change-over switch 31 or by holding switch 35. Generators 26 and 28 and the comparing circuit 29 are energized through switch 42 and the rest contact of relay 34. The luminous indicator 22 flickers at the above reference frequency adjusted to a fixed value, while the luminous indicator 23 flickers at the frequency adjusted on generator 28. The driver now turns the potentiometer coupled with scale 25 which is not seen because window 24 is closed, until the indicator 23 flickers at the same frequency as indicator 22. In this way the frequencies of generators 26 and 28 are equalized whereby the comparing circuit 29 becomes operative for energizing relay 30. Switch 31 is thus changed over and prepares the starting circuit through rest contact 33. The driver now seizes a lever for actuating contact 40 and carries the same upwardly until contacts 39 and 40 are closed. Hereby the starting circuit is closed and the starting relay 34 is energized and holds itself through its contact 35. In the case of a motor car the ignition circuit 43 is herewith closed and the motor may be started.

When the driver is no longer able to see the flickering of the indicator 22 he is also unable to adjust the frequency of generator 28 to the reference frequency of generator 26. By scanning the full frequency range of generator 28 it may be possible to energize the relay 30 temporarily, but this will not result in closure of the ignition circuit because contacts 39 and 40 are not yet closed. Continuous adjustment of the frequency of generator 28 with the frequency of generator 26 is only possible if the flickering of the luminous indicator 22 can be seen, this being the condition under which the driver is able to drive the car. Even if it may happen accidentally that continuous correct adjustment of generator 28 to the reference frequency occurs and consequently relay 30 is continuously energized, further checking of the vigilance is provided by the ability-testing switch 39, 40, 41. If the displaceable contact 40 is not moved vertically upwards along the prescribed path but is shifted somewhat to the right or left, it touches one of the contact bars 41 whereby circuit 41 is energized and opens the rest contact 33. Therefore, it is useless to close contacts 39 and 40 because the starting circuit is broken by contact 33. If contacts 39 and 40 are closed when relay 30 is deenergized the locking circuit 32 is also energized and opens the starting circuit. Therefore, several conditions have to be fullfilled in order to energize the starting and ignition circuits. The movable contact 40 immediately returns into its open rest position when its actuating lever is loosened.

The delay time of circuit 32 is in the order of 10 to 15 seconds, that is, when the locking circuit 32 should be energized in spite of correct adjustment of the frequency of generator 28 by faulty operation of switch 39, 40, 41, the switch may be actuated again after a reasonable delay time of 10 to 15 seconds.

When relay 34 is energized, the ignition circuit 43 remains closed until the main start switch 42 is opened. Independently of any accidental energization of the locking circuit 32 during normal driving, relay 34 cannot be deenergized except by opening the main start switch 42, for instance the lock switch of a motor car. When relay 34 is energized its rest contact 36 is opened and deenergizes generators 26 and 28 and the comparing circuit 29 whereby the luminous indicators 22 and 23 extinguish. At the same time the potentiometer coupled with scale 25 is reset into one of its end positions by means of a resetting motor having an end switch. Preferably the potentiometer is reset into the position corresponding to the highest frequency of generator 28. Resetting of the generator 28 to its highest frequency and the necessity resulting therefrom to adjust the frequency from the highest value to the reference frequency has the advantage that groping towards the correct frequency is practically impossible when the vigilance of the operator is so reduced that he cannot see the flickering of the luminous indicator 22. If under these circumstances the luminous indicator first appears flickering when lowering the frequency of generator 28, the adjusted frequency is already below the reference frequency and energization of the starting circuits is impossible even when switch 39, 40 is correctly operated. If generator 28 would be reset at the end of each test period to its lowest frequency it might often be possible for the operator to grope towards the correct adjustment even with insufficient vigilance by turning the scale 25 somewhat further in the sense of increasing frequency from the point where flickering of the luminous indicator 23 disappears.

For use of the device illustrated in FIG. 5 without the locking circuit in order to check the personal vigilance, pressure switch 38 is actuated whereby indicators 22 and 23 or indicator 22 only are illuminated. When the flickering of indicator 22 is seen the operator may assume that his personal condition is sufficient for driving a vehicle.

The device according to FIG. 5 also allows testing of the person for which the device is adapted, for instance by the police. It may easily be checked at any time whether the person is able to fullfill all conditions as mentioned above for properly operating the circuits and starting the vehicle. In this way it is possible to check in an absolutely objective way whether the vigilance has really sunk below a predetermined allowable limit value.

In a simplified embodiment of the device for voluntary checking the personal vigilance the locking circuitry consisting of parts 29 to 43 may be omitted and the scale 25 may always be visible. With such a modified apparatus the actual vigilance may be checked at any time by finding out whether or not the flickering of indicator 22 is still seen. On the other hand int may be ascertained exactly by means of the indicator 23 and fine adjustment of scale 25, at which frequency flicker fusion occurs, whereby an exact indication on the vigilance is obtained. For such a test the luminous indicator 22 may be covered by means of a diaphragm or cover or generator 26 may be switched off in order that this indicator flickering at the reference frequency does not disturb an accurate measurement. Such a simplified device may be designed in the form of a portable pocket apparatus of relatively small size and may be combined with other objects such as watches or the like.

The locking circuitry of which a substantially electromechanical version is shown in FIG. 5 may be replaced by a fully electronic logical circuit.

In the embodiments illustrated in FIGS. 1 and 2 the luminous indicators are energized as long as the ignition circuit is energized. This may be avoided by providing a third switch 10'' shown in broken lines in FIGS. 1 and 2 on the temporarily operable switch 10, 10', 59 and energizing the generator 0 and indicators through this switch 10'' only. The indicators will thus only operate for a limited time of a few seconds during which the device must properly be operated for starting the vehicle.

What we claim is:

1. A device for testing the vigilance of a person based on the individual flicker fusion threshold of that person, comprising at least two simultaneously and independently operable luminous indicators and at least two energy sources adapted to individually operate separate luminous indicators, at least one luminous indicator energized for flickering illumination within the range of usual flicker fusion thresholds being disposed at the side of at least one further luminous indicator adapted to be energized under different conditions, thereby allowing comparison of at least two indications by said person.

2. A device according to claim 1, wherein said energy sources are adapted to illuminate all luminous indicators with the same brightness.

3. A device according to claim 2, comprising a luminous indicator energized for flickering illumination at the side of at least one luminous indicator energized for continuous illumination.

4. A device according to claim 1, for supervision of the starting circuit of a vehicle comprising a supervising circuit including switches associated each with one of the luminous indicators, an alternating current generator and means for connecting one of said luminous indicators to said generator in order to produce flickering of this one luminous indicator, said switches being adapted for opening and keeping open respectively said starting circuit upon operation of a hand switch not associated to said one flickering luminous indicator.

5. A device according to claim 4, comprising automatic means for changing the place of at least said one flickering luminous indicator.

6. A device according to claim 5, comprising luminous indicators and hand switches associated therewith disposed in a centralsymmetrical arrangement on a rotatable support, said automatic means being operatively coupled with said support for rotating the same to arbitrary positions.

7. A device according to claim 4, comprising a change-over switch and a hand switch associated with each of said luminous indicators, all change-over switches being series-connected into the starting circuit when in their rest position, and each of said changeover switches being connected to one of said hand switches when in a test position, the change-over switch associated with the flickering luminous indicator being thrown into its test position.

8. A device according to claim 4, comprising timing means for operating said luminous indicators for limited time intervals.

9. A device according to claim 8, wherein said timing means are adapted for transitorily preparing said starting circuit, a hand-operable holding relay being connected in parallel with the timing means.

10. A device according to claim 1, comprising a number of luminous indicators simultaneously operable by sources of graduated frequencies.

11. A device according to claim 10, said luminous indicators being disposed in a vertical row.

12. A device according to claim 4, comprising a locking circuit operable for breaking the starting circuit during a limited time interval upon faulty operation of the device.

13. A device according to claim 10, comprising a grid of luminous indicators, generator means for illuminating said luminous indicators at graduated flicker frequencies in the one coordinate direction and resistor means for illuminating said luminous indicators with graduated luminosity in the other coordinate direction.

14. A device according to claim 1, comprising an alternating-voltage generator of adjustable frequency and a luminous indicator connected to the same and flickering at the generator frequency, a reference generator and a luminous indicator associated therewith and flickering at a reference frequency, said reference generator being adjusted to a predetermined reference frequency.

15. A device according to claim 14, comprising a comparing circuit connected to said generators and operable when the frequency of said alternating-voltage generator is equal to said reference frequency.

16. A device according to claim 14, comprising means for suppressing indication by the luminous indicator for the reference frequency.

17. A device according to claim 14, comprising a scale for indication of the adjusted generator frequency.

18. A device according to claim 17, comprising means for covering said scale.

19. A device according to claim 15, for supervision of a starting circuit of a vehicle, wherein said comparing circuit is operable for supervision of the starting circuit.

20. A device according to claim 19, comprising a start relay operable by said comparing circuit.

21. A device according to claim 20, comprising a manually operable start switch in said starting circuit, this start switch being selectively connected to an ignition circuit and a locking circuit respectively through a change-over switch of said start relay.

22. A device according to claim 21, wherein said manually operable switch is an ability-testing device connected into and closing said locking circuit upon faulty operation.

23. A device according to claim 21, said locking circuit comprising a monostable delay circuit and a breaking switch operable thereby in said starting circuit.

24. A device accordint to claim 23, comprising a starting unit operable through said ignition circuit and adapted to be deenergized by a main switch.

25. A device according to claim 24, wherein said starting unit has a circuit braker in the energizing circuit of said generators.

26. A device according to claim 25, comprising a time relay in the energizing circuit of said generators for operating them during limited time intervals.

27. A device according to claim 1 comprising a plurality of luminous indicators simultaneously operable by sources of graduated intensities.

28. Apparatus for testing the vigilance of an individual based upon the individual flicker-fusion threshold of said individual, comprising at least two simultaneously and independently operable luminous indicators;
- means for energizing at least one of said luminous indicators for continuous illumination;
- means for energizing one of said luminous indicators disposed at the side of said continuously illuminated indicator, for flicker illumination within the range of the usual flicker fusion thresholds; and
- means operable by said individual to indicate recognition of the said comparative illumination states of said side-by-side indicators.

* * * * *